United States Patent [19]

Lamb et al.

[11] Patent Number: 5,775,334
[45] Date of Patent: Jul. 7, 1998

[54] LIMB POSITIONING APPARATUS FOR SURGERY

[75] Inventors: Steven R. Lamb, Union City; Eugene M. Wolf, San Francisco; Russel E. Klein, Redwood City, all of Calif.

[73] Assignee: Orthopedic Systems, Inc., Union City, Calif.

[21] Appl. No.: 619,827

[22] Filed: Mar. 15, 1996

[51] Int. Cl.$^6$ ........................................ A61G 15/00
[52] U.S. Cl. ..................... 128/845; 128/878; 602/21
[58] Field of Search ................... 128/845, 846, 128/877, 878, 879; 602/20–23, 32–40

[56] References Cited

U.S. PATENT DOCUMENTS

| | | | |
|---|---|---|---|
| 2,456,182 | 12/1948 | Goble | 285/92 |
| 2,510,198 | 6/1950 | Tesmer | 248/226 |
| 3,020,012 | 2/1962 | Moracco et al. | 248/16 |
| 3,167,068 | 1/1965 | Carr | 602/32 |
| 3,353,771 | 11/1967 | Bow | 248/3 |
| 3,462,103 | 8/1969 | Strom | 248/13 |
| 3,654,833 | 4/1972 | Griffiths | 91/41 |
| 3,917,200 | 11/1975 | Johnson | 248/13 |
| 4,070,011 | 1/1978 | Glesser | 269/45 |
| 4,332,989 | 6/1982 | Nicolaisen | 200/47 |
| 4,339,984 | 7/1982 | Huhne | 192/146 |
| 4,545,573 | 10/1985 | Murphy | 269/328 |
| 4,616,637 | 10/1986 | Caspari | 602/36 |
| 4,807,618 | 2/1989 | Auchinleck et al. | 128/878 |
| 5,003,967 | 4/1991 | McConnell | 602/21 |
| 5,025,802 | 6/1991 | Laico | 128/882 |
| 5,290,220 | 3/1994 | Guhl | 128/882 |
| 5,395,304 | 3/1995 | Tarr | 602/20 |

OTHER PUBLICATIONS

Brochure. Andronic Devices Ltd., "Arthrobot® Limb Positioning Systems".
Brochure. Arthrex®, "Arthrex: Innovation & Vision in Arthroscopy", 1995.

*Primary Examiner*—Michael A. Brown
*Attorney, Agent, or Firm*—Bielen, Peterson & Lampe

[57] ABSTRACT

A limb positioning apparatus utilizing a structural member having a compartment with an opening thereto. The structural member is supported at a predetermined position relative to the limb and at a certain distance from the limb. A first line is linked or attached to the limb and connected to a constant force spring located within the compartment of the structural member. A second line is attachable to the limb and is also connected to a constant force spring lying within the compartment of the structural member. The forces exerted by the first and second constant force springs are applied cumulatively or alternatively to provide a predetermined tension force on the limb of the patient.

12 Claims, 4 Drawing Sheets

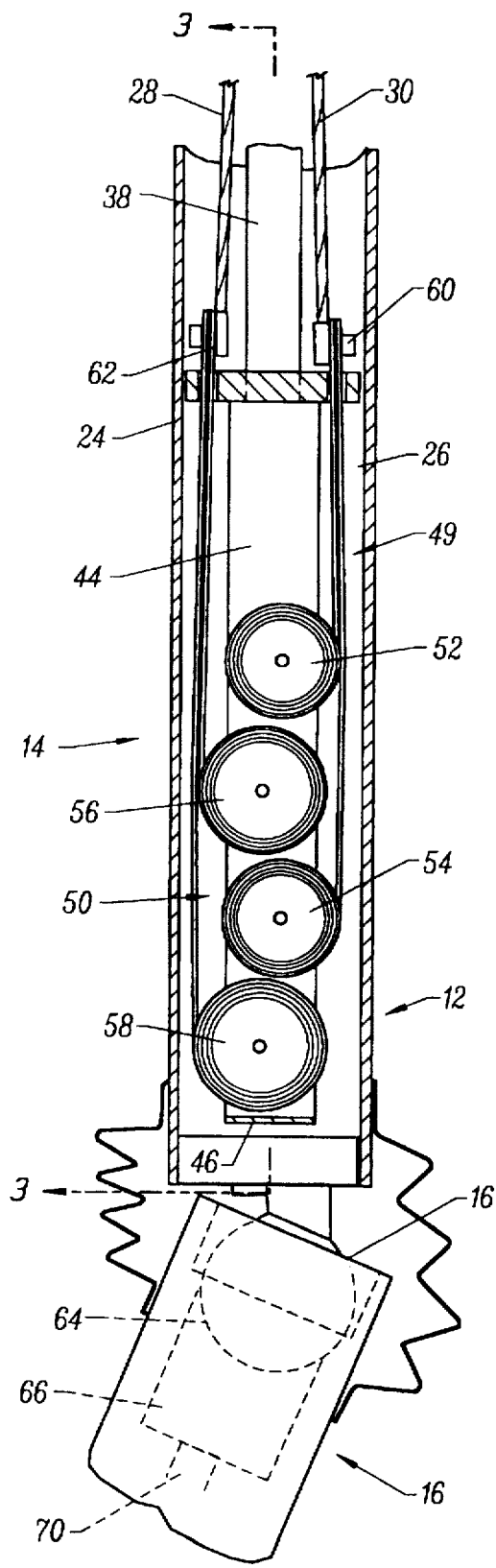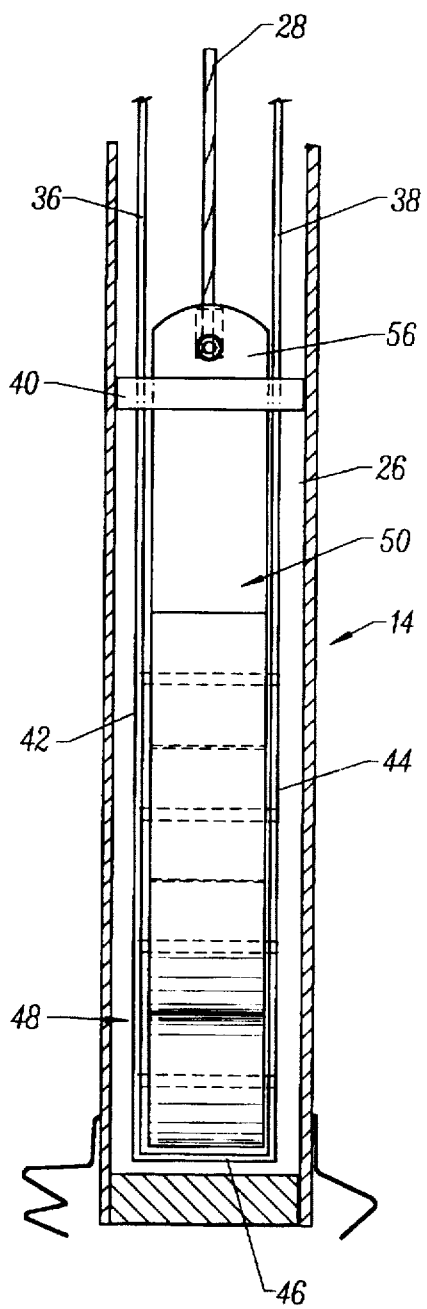
FIG. 2
FIG. 3

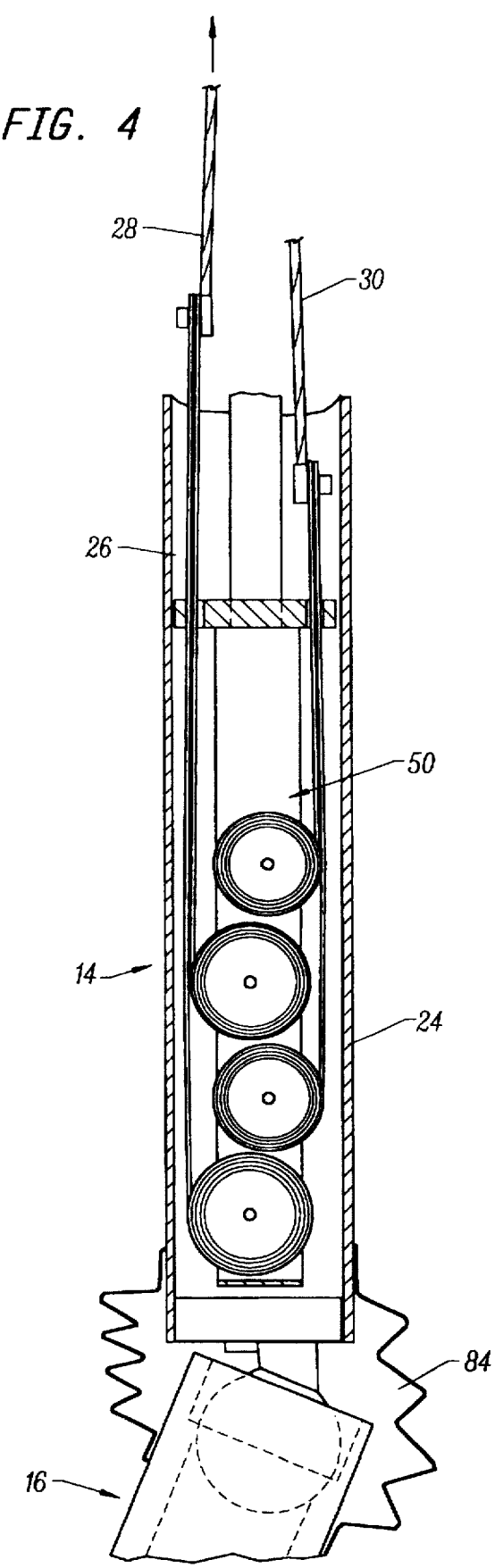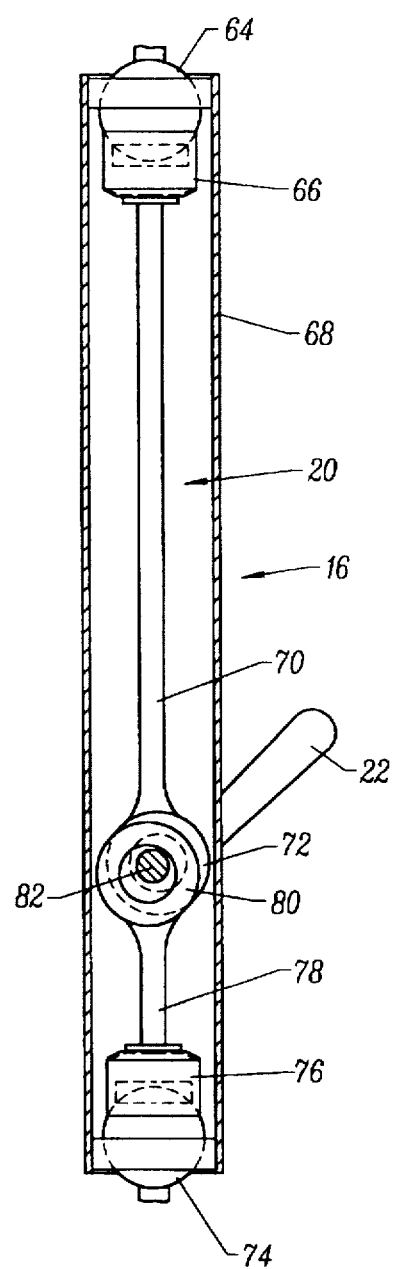

LIMB POSITIONING APPARATUS FOR SURGERY

BACKGROUND OF THE INVENTION

The present invention relates to a novel limb positioning apparatus particularly applicable to arthroscopic surgery.

Limb positioning devices have been devised to orient arms and legs of a patient during surgery techniques. Such traction devices are generally based on mechanical systems employed in robotics or other fields. For example, U.S. Pat. Nos. 3,020,012 3,462,103, and 3,917,200 describe boom supports using hydraulic or pneumatic means.

U.S. Pat. Nos. 2,456,182 and 3,353,771 show flexible joint assemblies that employ universal-type joints.

U.S. Pat. Nos. 3,510,198 and 4,070,011 describe articulated and flexible positioning supports for tools or other objects.

U.S. Pat. Nos. 3,654,833 and 4,339,984 show hydraulic and pneumatic controls for controlling positioning systems in substitution for mechanical means shown in the heretofore described patents.

U.S. Pat. Nos. 4,332,989 and 4,535,207 describe robotic systems employing feedback controls for movement of a mechanical device.

The application of prior mechanical positioning devices known in the industrial area to the medical field are exemplified by U.S. Pat. No. 4,545,573 which describes a surgical clamp for securing the thigh during an arthroscopic surgery. Also, U.S. Pat. No. 4,807,618 describes a limb positioning apparatus for employment in surgical procedures which uses an elaborate pneumatic positioning and control mechanism. The latter patent successfully positions limbs for arthroscopic surgery, but requires a complex system for control and is quite expensive to produce. A commercially available device known as the Arthrobot is believed to follow the teachings of U.S. Pat. No. 4,807,618.

A limb positioning system known as the Arthrex employs counterweights in a mechanical system to position limbs for surgery.

Again, although the latter devices are successful in providing traction control for a limb, mechanical systems are often difficult to employ and possibly dangerous to the patient in certain situations.

A limb positioning apparatus for surgery which overcomes the problems of the prior art would be a notable advance in the medical field.

SUMMARY OF THE INVENTION

In accordance with the present invention a novel and useful limb positioning apparatus for surgery is herein provided.

The present invention utilizes a structural member which includes a compartment having an opening thereto. The structural member may be composed of a series of articulated portions each adjustably fixable relative to one another.

Support means is also found in the present invention for holding the structural member in a predetermined position relative to the limb of the patient and at a certain distance from the limb. Such support means may entail the use of a locking ball and socket joint or other suitable means for providing articulation between the portions of the structural member. In addition, the support means may further be delineated by a mount for holding one end of the structural member to a surface such as a surgery table.

First and second lines in the form of strings, chords, cables, and the like, are also provided in the present application. Each line includes attachment means which are connectable to the line and linkable to the limb. The first and second lines extend into the compartment of the structural member and are each linked or connected to at least one essentially constant force spring therewithin. Thus, each line may provide a constant tension when connected to the limb along a range of extension of that particular line. Further, multiple constant force springs may connected together within the compartment of the structural member to cumulate the tension force as desired. Each of the constant force springs may be connected to a support, such as a plate, which is fixed within the compartment of the structural member. The plat support permits the constant force spring to rotate around a fixed axis.

The line or lines exiting the compartment of the structural member may be separated by a guide, which obviates twisting or fowling of such lines when in use. Thus, the user of the apparatus of the present invention may quickly and easily determine the particular tension force required to support a limb in a particular position by simply attaching connectors at the termini of one or more of the lines to the limb.

It may apparent that a novel and useful positioning apparatus for a limb during a surgical procedure has been herein described.

It is therefore an object of the present invention to provide a positioning apparatus for a limb which is simple to manufacture and use.

Another object of the present invention is to provide a positioning apparatus for a limb which is capable of exerting a tension force of a particular value through the use of multiple lines leading from the apparatus and throughout a relatively large range of extension of those lines relative to the limb.

Another object of the present invention is to provide a positioning apparatus for the limb which uses leverage on the limb developed only by mechanical linkage and which does not rely on any external power sources or does not achieve manipulation through electrical or pneumatic controls.

A further object of the present invention is to provide a positioning apparatus for the limb which provides a surgeon performing surgery on a patient simple and convenient control of the position of the patient's limb.

The invention possesses other objects and advantages especially as concerns particular characteristics and features thereof which will become apparent as the specification continues.

BRIEF DESCRIPTION OF THE DRAWINGS

FIG. 2 is a sectional view of the spring containing portion of the present invention articulated relative to another portion of the structural member.

FIG. 3 is a sectional view taken along line 3—3 of FIG. 2.

FIG. 4 is a sectional view of the spring containing portion of the present invention showing the extension of one of the lines in connected constant force springs.

FIG. 5 is a sectional view of the ball and socket locking mechanism of a portion of the structural member of the present invention.

For a better understanding of the invention reference is made to the following detailed description of the preferred embodiments thereof which should be taken in conjunction with the hereinabove described drawings.

DETAILED DESCRIPTION OF THE PREFERRED EMBODIMENTS

Various aspects of the present invention will evolve from the following detailed description of the preferred embodiments which should be referenced to the prior described drawings.

Figure 1:
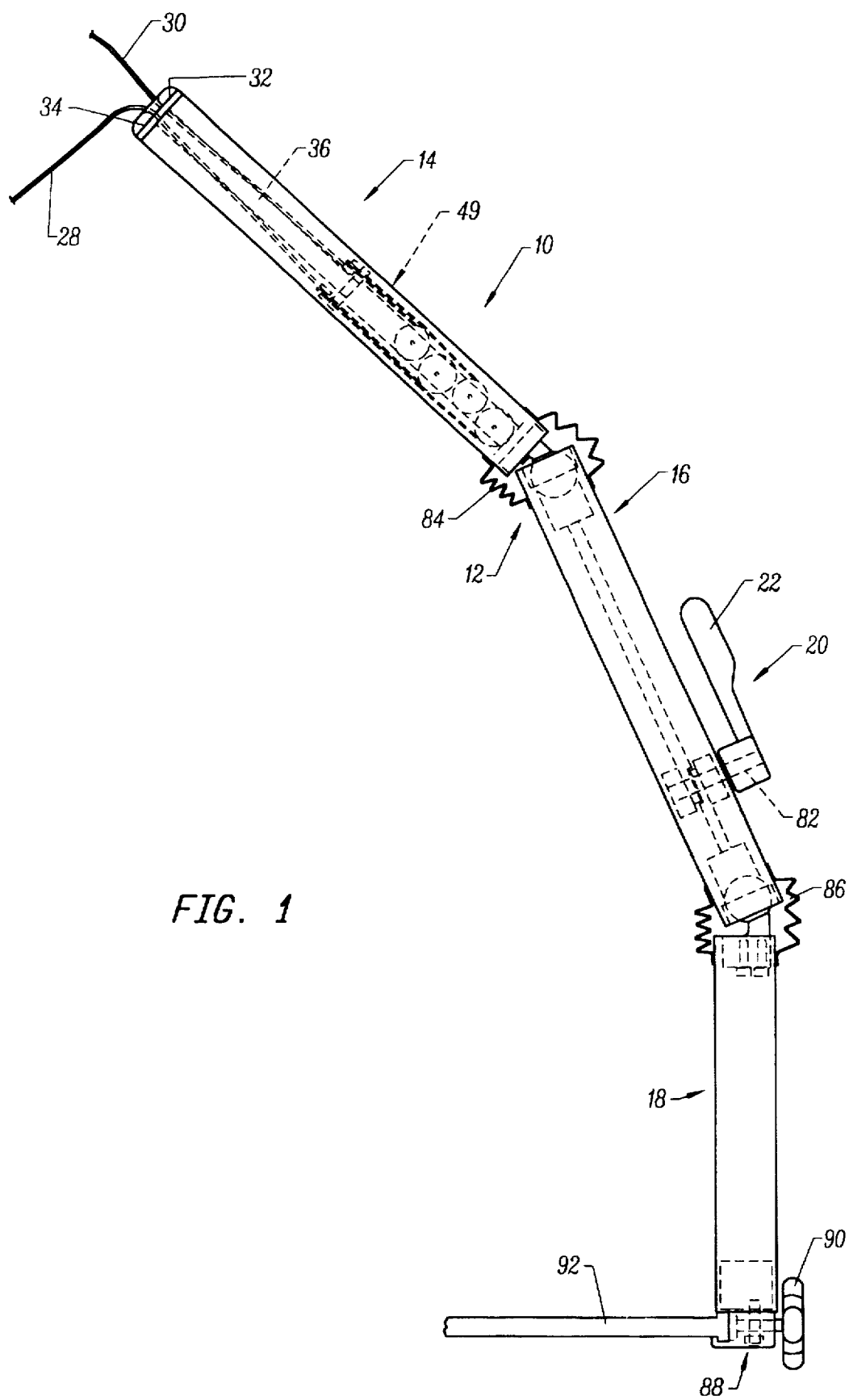
FIG. 1 is a front elevational view of the device of the present invention.

The invention as a whole is shown in the drawings by reference character 10. The apparatus 10 is employed to position a limb 96 of a patient 94 upon whom surgery is to be performed, FIG. 6, which will be detailed hereinafter. Apparatus 10 includes as one of its elements a structural member 12, FIG. 1, having first portion 14, second portion 16, and third portion 18 in articulated relationship with one another. The ball joint locking mechanism 20 fixes first, second, and third portions 14, 16, and 18, respectively, relative to one another in a desired orientation by the use of a lever 22 which is accessible to the surgeon. The particular structure of ball joint locking mechanism 20 will be discussed in greater detail as the specification continues.

Turning to FIG. 2, it may be observed that first portion 14 of structural member 12 is depicted. First portion 14 includes a tube 24 having a compartment 26 therewithin. Lines 28 and 30 extend through an opening 32 in cap 34 which lies at one end of first portion 14 of structural member 12. Straps 36 and 38 connect to cap 34 and extend into compartment 36. Guide 40, found within compartment 26, also connects to straps 36 and 38. Plates 42 and 44 extend from guide 40 further into compartment 26. Plates 42 and 44 are connected to each other by a bridging member 46 to form a U-shaped structure 48. It should be noted that cap 34, straps 36 and 38, guide 40, and U-shaped structure 48 may be formed as a single unit 49 which is placable within compartment 26 of first portion 14 of structural member 12.

A plurality of constant force springs 50 are placed between plates 42 and 40 for rotation or pivoting. Thus, constant force springs 52 and 54 are spaced from one another, as are constant force springs 56 and 58. As depicted in FIG. 2, constant force springs 52 and 54 are of the same size, however, sizing of such springs may be different according to the particular use of apparatus 10. The same consideration applies to larger constant force springs 56 and 58 which are shown to be of equal size. Pin 60 links the bitter tab ends of constant force springs 52 and 54 together. Likewise, pin 62 links the bitter ends of constant force springs 56 and 58 together. In certain cases, any one of the plurality of springs 50 may not be linked to another spring and act alone. Pin 60 links to line 30 while pin 62 links to line 28. Thus, the tension force on line 30 is of a value which is cumulative of the tension force exerted by constant force springs 52 and 54. Likewise, the tension on line 28 becomes the addition of the tension force of constant force springs 56 and 58. For example, if constant force springs 52 and 54 had a value of 5 pounds of force each, the tension on line 30 would be 10 pounds of force. If constant force springs 56 and 58 were of a value of 7½ pounds of force, the tension on line 28 would be 15 pounds of force. It should be noted that either line 28 or 30 or another line (not shown) may be attached to a single constant force spring. If that line were attached only to constant force spring 52, for example, then the value of the tension force would be 5 pounds. Constant force spring 50 may be of the type sold under the designation CF by Associated Springs, Barnes Group, of Corry, Pa., and may be constructed of stainless steel. It has been found that such springs exhibit a constant force over at least 25 centimeters of extension.

Turning to FIG. 5, it may be observed that second portion 16 and ball joint locking mechanism 20 is further detailed. Ball 64, connected to tube 24 of first portion 14, extends downwardly into cup 66. A part of ball 64 and cup 66 lie within tube 68 of second portion 16. Arm 70 extends from seat 66 to lobe 72. Also, ball 74 connected to third portion 18 of structural member 12 lies in seat 76 linked to arm 78 and lobe 80. Lever 22 turns a pivoting axle 82 which rides on the interior openings of lobes 72 and 80. Thus, the turning of lever 22 either forces arms 70 and 78 toward or away from balls 64 and 74 and connected portions 12 and 18, respectively. When arms 70 and 78 are forced toward balls 64 and 74, seats 66 and 76 hold balls 64 and 74 against movement. The movement of lever 22 in the opposite direction loosens this ball and seat connection to permit movement of first, second, and third portions 14, 16, and 18 relative to one another. Boots 84 and 86 cover the interconnection places between first and second portions 14 and 16 and second and third portions 16 and 18, respectively, FIGS. 1 and 4.

Clamp 88 having knob or wheel 90, holds structural member 12, specifically third portion 18 of structural member 12, to a body such as surgery table 92. Clamp 88 may be of conventional construction.

Figure 6:
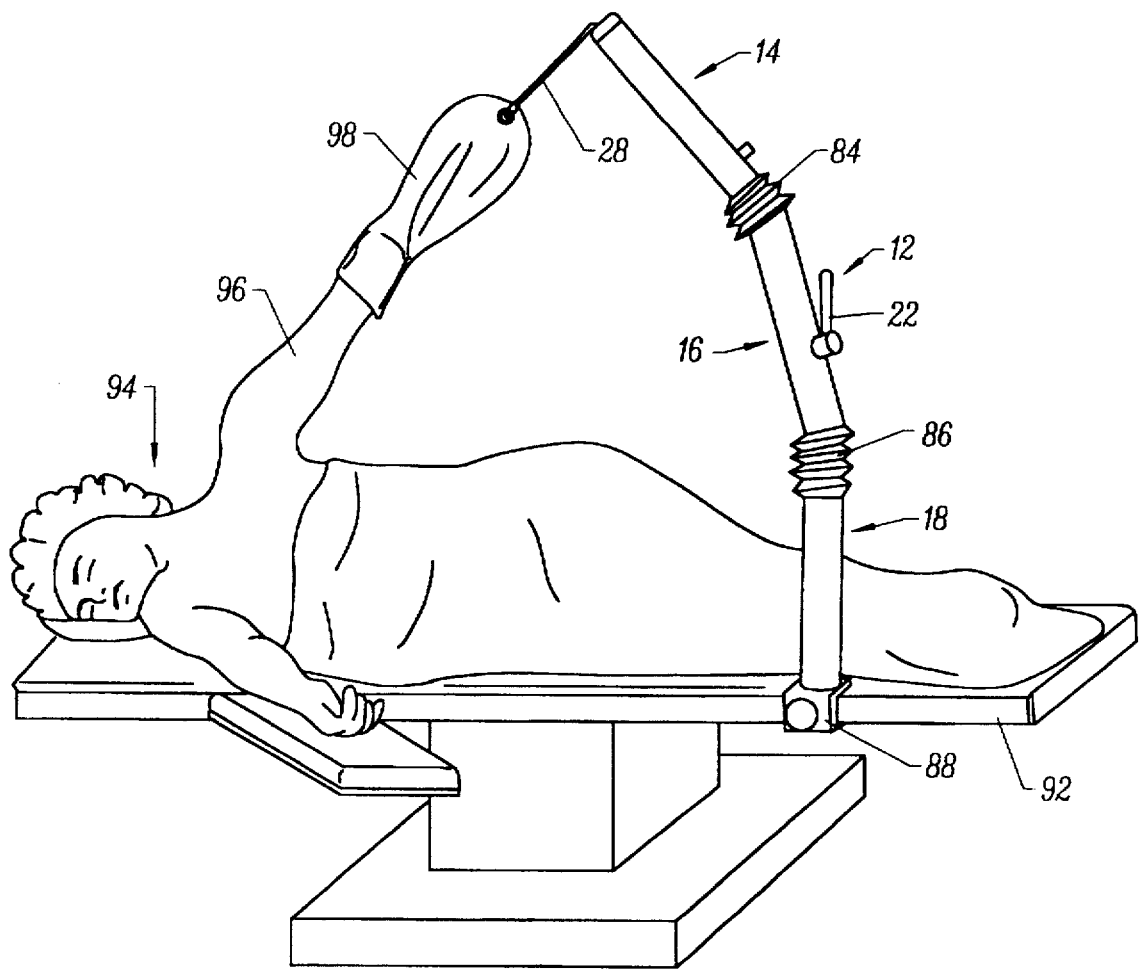
FIG. 6 is an overall perspective view showing the apparatus of the present invention in use on a patient lying on a surgery table.

In operation, a patient 94 is placed on surgery table 92 as depicted in FIG. 6. A limb, such as arm 96, is extended upwardly and attached to a mit 98 which fits over the hand portion (obscured by mit 98) of limb 96. Lines 28 and 30, singly or in combination, are attached to mit 98 depending on the particular tension required along arm 96. Lever 22 is then loosened and/or tightened to position structural member 12 to provide the proper position of structural member 12 relative to arm 96. Of course, clamp 88 holds structural member 12 to surgery table 92 in this regard. The surgeon then performs arthroscopic surgery on patient 94. Adjustment or re-adjustment of apparatus 10 is easily accomplished by the loosening of lever 22 and moving articulated portions 14, 16, and 18 relative to one another as desired. Lines 28 and 30 are used in tandem or singularly, as heretofore described, at any point during the arthroscopic operation. Also, the actual value of the tension on lines 28 and 30 may be predetermined by the use of plurality of constant force springs 50 found within compartment 26 of first portion 14 of structural member 12. The tension force producing unit 49 found in compartment 26 may be interchanged prior to the operation with a similar one having different values of plurality of constant force springs 50. The resultant apparatus 10 is simple to operate and provides the surgeon with complete control of the tension on and the position of arm 96 during arthroscopic surgery.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A positioning apparatus for the limb of a patient, comprising:

a. a structural member, said structural member including a compartment having an opening thereto;

b. support means for holding said structural member in a predetermined position relative to the limb and at a certain distance from the limb;

c. a first line having attachment means connected thereto for linkage to the limb, d. a first essentially constant force spring connected to said first line for exerting a constant tension force thereupon, said first constant force spring lying within said compartment of said structural member, said first line extending from said compartment;

e. a second line having attachment means connected thereto for linkage to the limb; and f. a second essentially constant force spring connected to said second line for exerting a tension force thereupon, said second constant force spring lying within said compartment of said structural member, said second line extending from said compartment.

2. The apparatus of claim 1 which additionally comprises a guide located at said structural member to determine the position of said first and second lines relative to one another at said opening of said compartment.

3. The apparatus of claim 1 in which said structural member comprises at least a first and second portion, said first portion being articulated relative to said second portion.

4. The apparatus of claim 1 which further comprises a plate located in said compartment, said first and second essentially constant force springs, each being pivotally connected to said plate.

5. The apparatus of claim 1 which further comprises a third essentially constant force spring lying in said compartment of said structural member, said first and third constant force springs being linked to one another for compilation of said constant force, said connected first and third essentially constant force springs being connected to said first line.

6. The apparatus of claim 5 in which the tension forces exerted on said first line by said first and third springs are of a different value.

7. The apparatus of claim 1 in which the tension forces exerted on said first and second lines by said first and second essentially constant force springs, respectively are of different values.

8. The apparatus of claim 1 in which said attachment means comprises a detachable connector at the termini of said first and second lines for linkage to the limb.

9. The apparatus of claim 1 in which said support means further comprises mounting means for holding said structural member to a surface.

10. The apparatus of claim 9 which additionally comprises a guide located at said structural member to determine the position of said first and second lines relative to one another at said opening of said compartment.

11. The apparatus of claim 10 which said structural member comprises at least a first and second portion, said first portion being articulated relative to said second portion.

12. The apparatus of claim 11 which further comprises a plate located in said compartment, said first and second essentially constant force springs, each being pivotally connected to said plate.

* * * * *